(12) United States Patent
Sumi (10) Patent No.: US 9,081,195 B2
(45) Date of Patent: Jul. 14, 2015

(54) THREE-DIMENSIONAL IMAGE DISPLAY APPARATUS AND THREE-DIMENSIONAL IMAGE PROCESSING METHOD

(75) Inventor: Naoki Sumi, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 331 days.

(21) Appl. No.: 13/584,063

(22) Filed: Aug. 13, 2012

(65) Prior Publication Data

US 2014/0043323 A1 Feb. 13, 2014

(51) Int. Cl.
*G06T 15/00* (2011.01)
*G02B 27/22* (2006.01)
*H04N 13/04* (2006.01)

(52) U.S. Cl.
CPC ............ *G02B 27/22* (2013.01); *H04N 13/0404* (2013.01); *H04N 13/0415* (2013.01); *H04N 13/0447* (2013.01); *H04N 13/0468* (2013.01); *H04N 13/0477* (2013.01); *H04N 13/0484* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| 2001/0026351 A1* | 10/2001 | Gao et al. ........................ 351/227 |
| 2005/0089196 A1* | 4/2005 | Gu et al. ........................ 382/107 |
| 2008/0137909 A1* | 6/2008 | Lee et al. ........................ 382/103 |
| 2009/0096768 A1* | 4/2009 | Ohira et al. ........................ 345/175 |
| 2012/0013649 A1* | 1/2012 | Higashi et al. ................... 345/690 |
| 2012/0170804 A1* | 7/2012 | Lin et al. ........................ 382/103 |
| 2013/0016095 A1* | 1/2013 | Park et al. ........................ 345/419 |
| 2013/0117717 A1* | 5/2013 | Song et al. ........................ 715/852 |

FOREIGN PATENT DOCUMENTS

| CN | 102426486 A | 4/2012 |
| JP | 9160144 | 6/1997 |
| JP | 2011193314 | 9/2011 |

* cited by examiner

*Primary Examiner* — Mark Zimmerman
*Assistant Examiner* — Michelle Chin
(74) *Attorney, Agent, or Firm* — Muncy, Geissler, Olds & Lowe, P.C.

(57) ABSTRACT

A 3D image display apparatus includes a tracking module, a position calculating module, an intensity calculating module, a 3D image processing module, an image converting module and a display module. The tracking module tracks an object and outputs coordinate information of the object. The position calculating module outputs position information according to the coordinate information. The intensity calculating module outputs intensity coefficient information according to the position information. The 3D image processing module receives the intensity coefficient information. The image converting module outputs target intensity information to the 3D image processing module according to original 3D image information. The display module receives modified 3D image information. The 3D image processing module outputs modified intensity information to the image converting module according to the intensity coefficient information and the target intensity information, and then the image converting module outputs the modified 3D image information according the modified intensity information.

15 Claims, 6 Drawing Sheets

THREE-DIMENSIONAL IMAGE DISPLAY APPARATUS AND THREE-DIMENSIONAL IMAGE PROCESSING METHOD

BACKGROUND OF THE INVENTION

1. Field of Invention

The present invention relates to an image display apparatus and processing method, and in particular, to a three-dimensional (3D) image display apparatus and processing method.

2. Related Art

In general, three-dimensional (3D) image display apparatuses are categorized into stereoscopic display apparatuses and autostereoscopic display apparatuses (also referred to naked-eye type 3D image display apparatuses). Regarding to the stereoscopic display apparatus, the user has to wear a viewing aid, such as shutter glasses, so that the left and right eyes of the user can receive different images respectively, and thereby perceiving a 3D image. Regarding to the autostereoscopic display apparatus, a specially designed optical element is configured so as to allow the display apparatus to provide different images to the left and right eyes of a user respectively, so that the user can perceive a 3D image by naked eyes.

Figure 1:
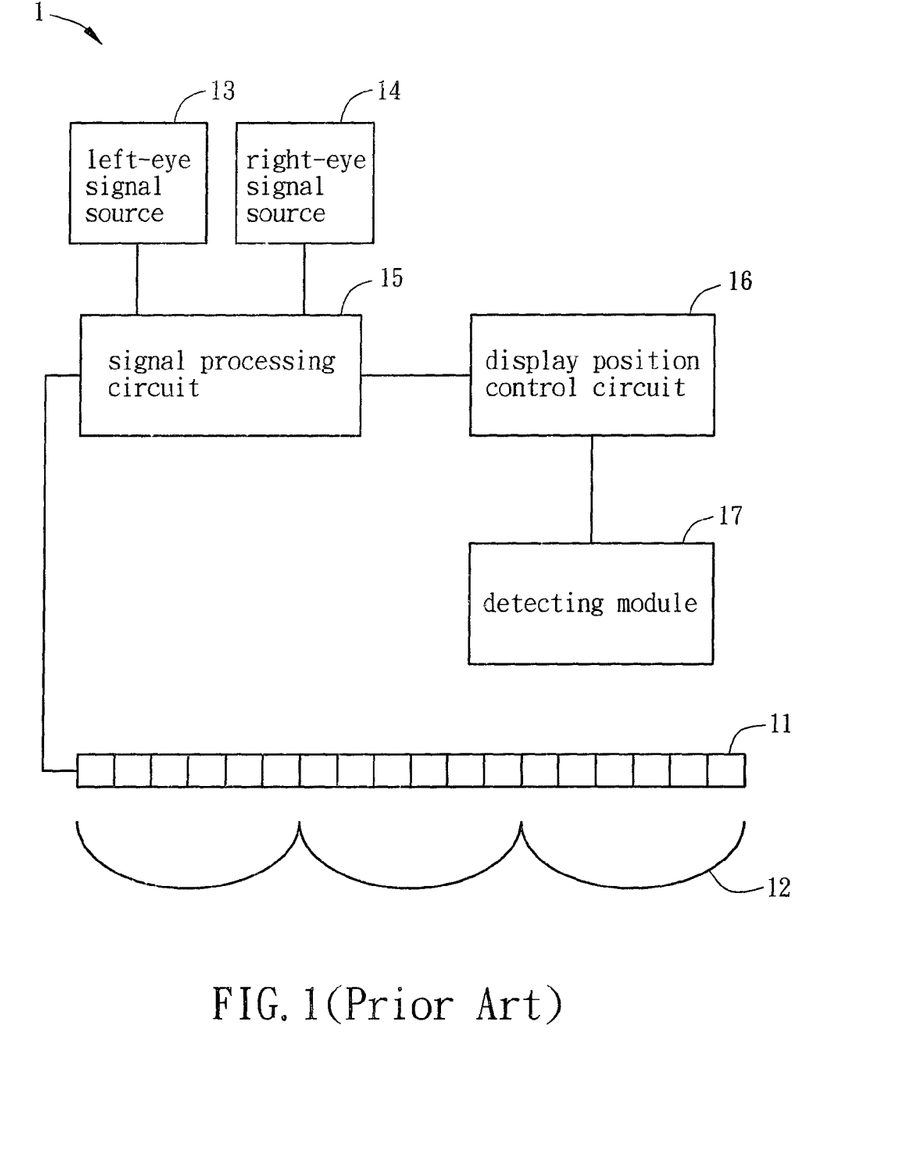
FIG. 1 is a schematic diagram showing a conventional 3D image display apparatus.

FIG. 1 is a schematic diagram showing a conventional 3D image display apparatus 1, which includes a display panel 11, an optical unit 12, a left-eye signal source 13, a right-eye signal source 14, a signal processing circuit 15, a display position control circuit 16, and a detecting module 17. The optical unit 12 is disposed at one side of the display panel 11, and the lenticular lenses of the optical unit 12 are disposed corresponding to six sub-pixels of the display panel 11, respectively. The left-eye signal source 13 and the right-eye signal source 14 provide the left-eye signals and the right-eye signals, respectively, to the signal processing circuit 15. The detecting module 17 detects the head position of the user, and the display position control circuit 16 controls the signal processing circuit 15 according to the changes of the head position of the user so as to adjust the pixels of display panel 11 to display the left-eye signal or the right-eye signal.

Although the conventional 3D image display apparatus 1 can adjust the pixels to display the left-eye signal or the right-eye signal according to the head position of the user, it still cannot avoid the undesired cross-talk issue generated as one eye of a user receives the left-eye signal and the right-eye signal simultaneously. Furthermore the conventional 3D image display apparatus 1 need to consume at least six sub-pixels to avoid an image motion juddering issue that may happen when head position is changed, it leads to display resolution loss.

Therefore, it is an important subject to provide a 3D image display apparatus and processing method that can reduce the undesired cross-talk issue and increase the resolution so as to improve the display effect.

SUMMARY OF THE INVENTION

In view of the foregoing subject, an objective of the present invention is to provide a three-dimensional (3D) image display apparatus and processing method that can reduce the undesired cross-talk issue and increase the resolution without the image motion juddering issue so as to improve the display effect.

To achieve the above objective, the present invention discloses a three-dimensional (3D) image display apparatus includes a tracking module, a position calculating module, an intensity calculating module, a 3D image processing module, an image converting module and a display module. The tracking module tracks an object and outputs coordinate information of the object. The position calculating module is coupled to the tracking module and outputs position information according to the coordinate information. The intensity calculating module is coupled to the position calculating module and outputs intensity coefficient information according to the position information. The 3D image processing module is coupled to the intensity calculating module for receiving the intensity coefficient information. The image converting module is coupled to the 3D image processing module and outputs target intensity information to the 3D image processing module according to original 3D image information. The display module is coupled to the image converting module for receiving modified 3D image information. The 3D image processing module outputs modified intensity information to the image converting module according to the intensity coefficient information and the target intensity information, and then the image converting module outputs the modified 3D image information according the modified intensity information.

In one embodiment, the tracking module includes a capturing unit and a coordinate calculating unit. The capturing unit captures an image of the object. The coordinate calculating unit is coupled to the capturing unit and produces the coordinate information according to the image of the object.

In one embodiment, the position calculating module includes a pixel position calculating unit and a parallax position calculating unit. The pixel position calculating unit is coupled to the tracking module for receiving the coordinate information. The parallax position calculating unit is coupled to the pixel position calculating unit and outputs parallax position information to the pixel position calculating unit. Accordingly, the pixel position calculating unit outputs the position information according to the coordinate information and the parallax position information.

In one embodiment, the intensity calculating module includes a sub-pixel intensity calculating unit coupled to the pixel position calculating unit and outputting the intensity coefficient information according to the position information.

In one embodiment, the intensity calculating module further includes a pixel intensity calculating unit coupled to the pixel position calculating unit and outputting pixel intensity information to the 3D image processing module according to the position information.

In one embodiment, the image converting module includes a first frame memory unit, a first converting unit, a second converting unit and a second frame memory unit. The first frame memory unit receives the original 3D image information and outputs a first set of gray-level information. The first converting unit is coupled to the first frame memory unit and the 3D image processing module, and outputs the target intensity information according to the first set of gray-level information. The second converting unit is coupled to the 3D image processing module and outputs a second set of gray-level information according to the modified intensity information. The second frame memory unit is coupled to the second converting unit and the display module, and outputs the modified 3D image information according to the second set of gray-level information.

In one embodiment, the 3D image display apparatus further includes an original 3D image input module coupled to the image converting module and outputting the original 3D image information to the image converting module.

To achieve the above objective, the present invention also discloses a 3D image display processing method, comprising the steps of tracking an object so as to output coordinate information of the object by a tracking module; outputting position information by a position calculating module according to the coordinate information; outputting intensity coefficient information to a 3D image processing module by an intensity calculating module according to the position information; outputting a target intensity information to the 3D image processing module by an image converting module according to an original 3D image information; outputting modified intensity information to the image converting module by the 3D image processing module according to the intensity coefficient information and the target intensity information; and outputting a modified 3D image information to a display module by the image converting module according to the modified intensity information.

In one embodiment, the step of tracking the object so as to output the coordinate information of the object includes capturing the image of the object by the tracking module, and producing the coordinate information by the tracking module according to the image of the object.

In one embodiment, the position information represents positions of a plurality of sub-pixels on the display module corresponding to the position information.

In one embodiment, the intensity coefficient information represents light intensities of the sub-pixels.

In one embodiment, the step of outputting the modified intensity information to the image converting module includes: outputting pixel intensity information to the 3D image processing module by the intensity calculating module; and outputting the modified intensity information by the 3D image processing module according to the pixel intensity information, the intensity coefficient information and the target intensity information.

In one embodiment, the step of outputting the modified 3D image information to the display module includes: producing a first set of gray-level information by the image converting module according to the original 3D image information, and converting the first set of gray-level information to the target intensity information; and converting the modified intensity information to a second set of gray-level information and outputting the modified 3D image information to the display module according to the second set of gray-level information.

As mentioned above, in the 3D image display apparatus and processing method of the present invention, the intensity calculating module outputs the intensity coefficient information to the 3D image processing module according to the position information, and the image converting module output the target intensity information to the 3D image processing module according to the original 3D image information. Accordingly, the 3D image processing module outputs the modified intensity information, and the display module can generate the modified 3D image information according to the modified intensity information. This procedure allows to reduce the undesired cross-talk issue and to increase the resolution, thereby improving the display effect.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
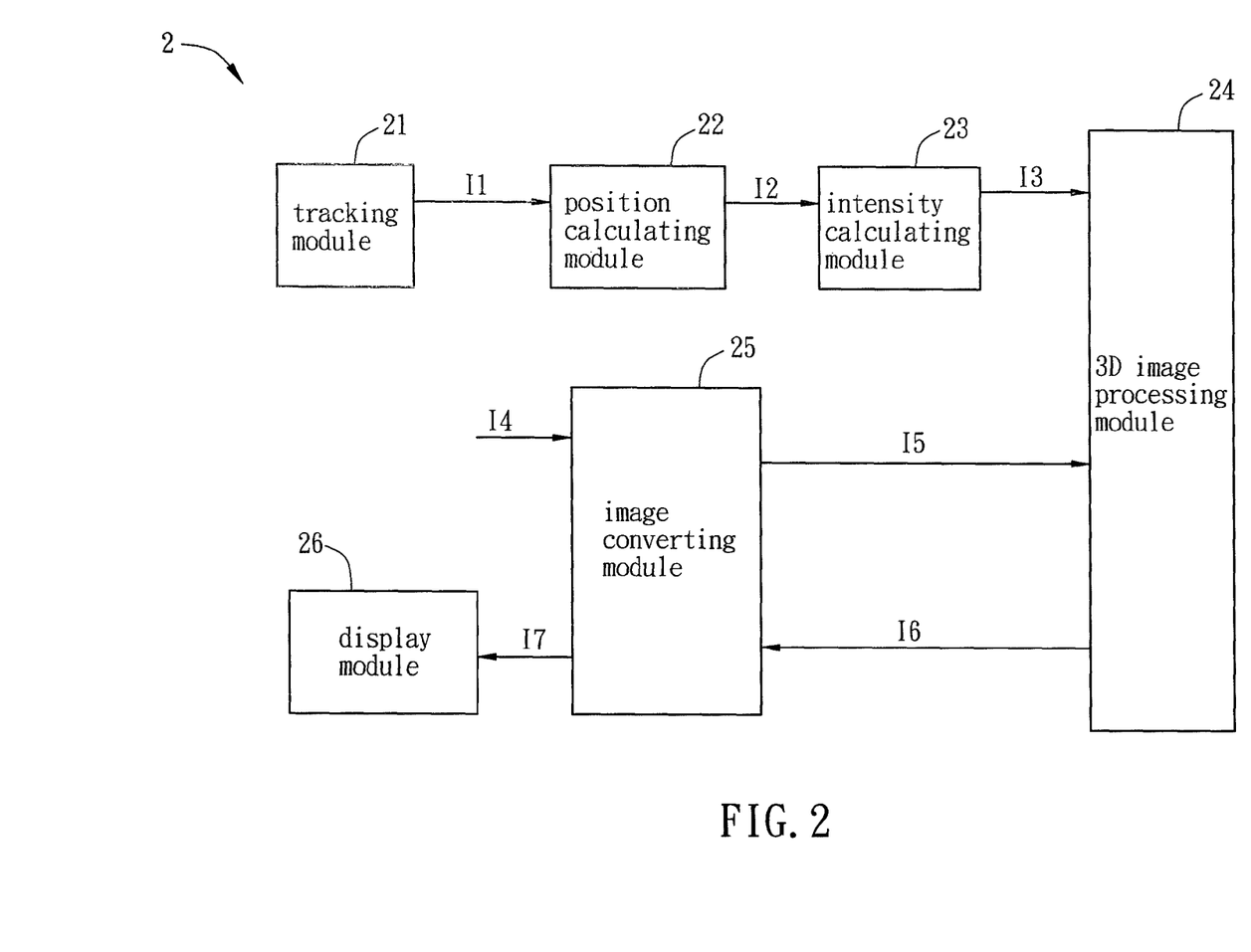
FIG. 2 is a schematic diagram showing a 3D image display apparatus according to a preferred embodiment of the present invention.

FIG. 2 is a schematic diagram showing a three-dimensional (3D) image display apparatus 2 according to a preferred embodiment of the present invention. The 3D image display apparatus 2 includes a tracking module 21, a position calculating module 22, an intensity calculating module 23, a 3D image processing module 24, an image converting module 25, and a display module 26.

The tracking module 21 is configured to track an object, such as the center point of each eye, the center point between the eyes, or the center point of the forehead. The tracking module 21 is continuously tracking the object so as to output the coordinate information I1 of the object in real time or once per frame time. Herein, the coordinate information I1 represents the 3D coordinate information of the location of the object.

The position calculating module 22 is coupled to the tracking module 21 for receiving the outputted coordinate information I1, and outputs the position information I2 according to the coordinate information I1 indicating the location of the object. Herein, the position information I2 represents the viewing positions of a plurality of sub-pixels on the display module 26 corresponding to the coordinate information I1 of the object such as the eyes of the user.

The intensity calculating module 23 is coupled to the position calculating module 22 and outputs the intensity coefficient information I3 according to the position information I2 outputted from the position calculating module 22. Herein, the intensity coefficient information I3 represents the light intensities of the sub-pixels corresponding to the coordinate information I1.

The 3D image processing module 24 is coupled to the intensity calculating module 23 for receiving the intensity coefficient information I3. The image converting module 25 is coupled to the 3D image processing module 24 and outputs the target intensity information I5 to the 3D image processing module 24 according to the original 3D image information I4. The 3D image processing module 24 outputs the modified intensity information I6 to the image converting module 25 according to the intensity coefficient information I3 and the target intensity information I5.

The display module 26 is coupled to the image converting module 25 for receiving the modified 3D image information I7 outputted from the image converting module 25. Herein, the modified 3D image information I7 is generated by the image converting module 25 according to the modified intensity information I6.

Figure 3A:
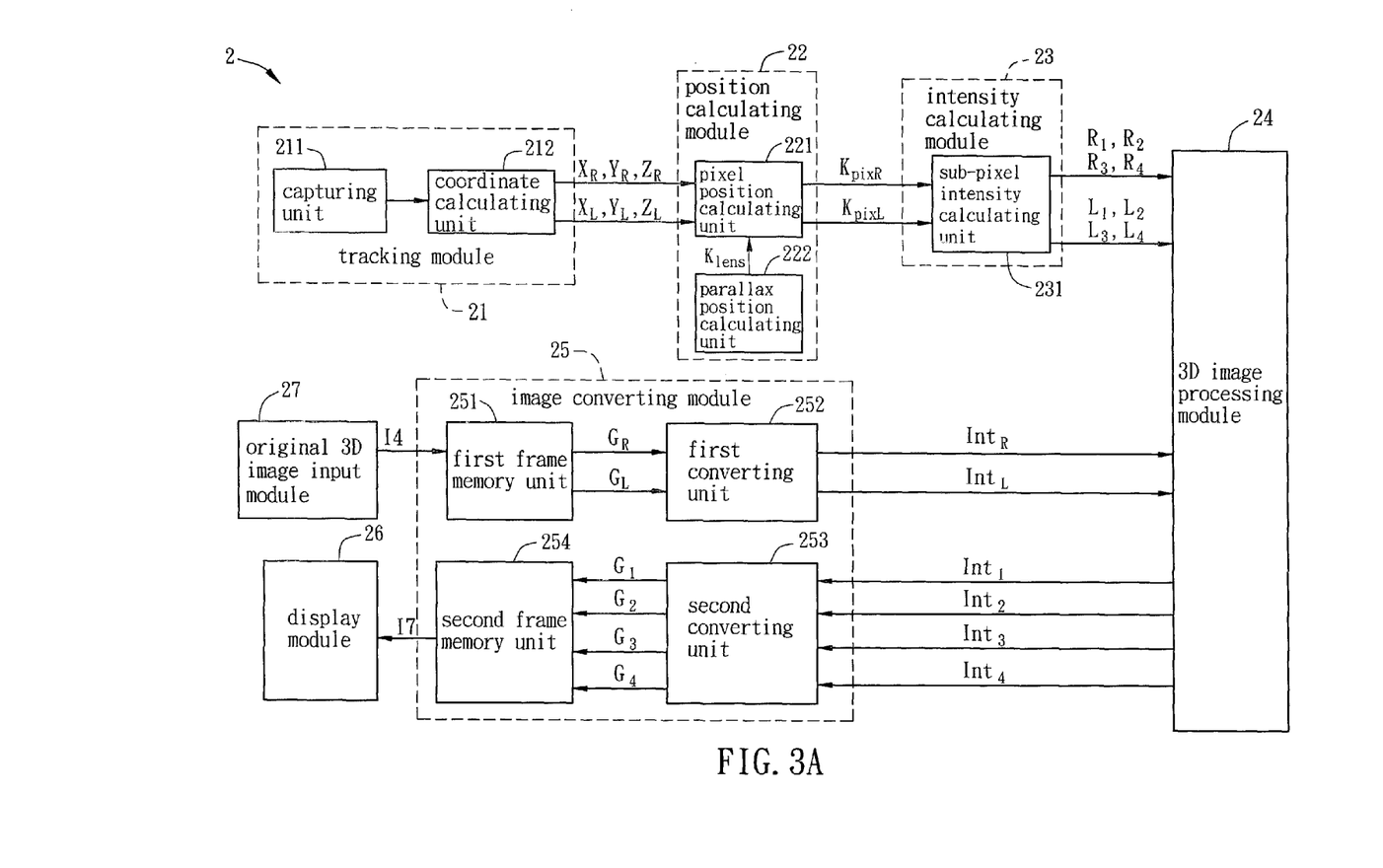
FIGS. 3A and 3B are schematic diagrams showing the 3D image display apparatus according to the embodiment of the present invention.

The 3D image display apparatus 2 of the invention will be further described herein after with reference to FIG. 2 in view of FIGS. 3A and 3B. In this embodiment, the 3D image display apparatus 2 further include an original 3D image input module 27 for generating the original 3D image information I4.

The tracking module 21 includes a capturing unit 211 and a coordinate calculating unit 212. The capturing unit 211 captures an image of the object. In practice, the capturing unit 211 is a camera mechanism such as an infrared camera or a charge coupled device (CCD) type camera. The coordinate calculating unit 212 is coupled to the capturing unit 211 and produces the coordinate information I1 according to the image of the object. In this embodiment, the coordinate calculating unit 212 takes the eyes of the user as a reference, and simultaneously generates the 3D coordinate information $X_L$, $Y_L$, $Z_L$ for the left eye of the user and the 3D coordinate information $X_R$, $Y_R$, $Z_R$ for the right eye of the user.

The position calculating module 22 includes a pixel position calculating unit 221 and a parallax position calculating unit 222. The pixel position calculating unit 221 is coupled to the coordinate calculating unit 212 of the tracking module 21 for receiving the 3D coordinate information $X_L$, $Y_L$, $Z_L$ for the left eye of the user and the 3D coordinate information $X_R$, $Y_R$, $Z_R$ for the right eye of the user. The parallax position calculating unit 222 is coupled to the pixel position calculating unit 221 and outputs the parallax position information $K_{lens}$ to the pixel position calculating unit 221 according to an equation or a look-up table. Herein, the parallax position information $K_{lens}$ relates to the relationship of the parallax element 261 and the sub-pixels 262 of the display module 26 (see FIG. 3B). Accordingly, the pixel position calculating unit 221 outputs the position information I2 according to the 3D coordinate information $X_L$, $Y_L$, $Z_L$ for the left eye, the 3D coordinate information $X_R$, $Y_R$, $Z_R$ for the right eye, and the parallax position information $K_{lens}$. Herein, the position information I2 represents the position information $K_{pixL}$ of the sub-pixels 262 covered by the parallax element 261 that is directly viewed by the left eye of the user, and the position information $K_{pixR}$ of the sub-pixels 262 covered by the parallax element 261 that is directly viewed by the right eye of the user.

Figure 3B:
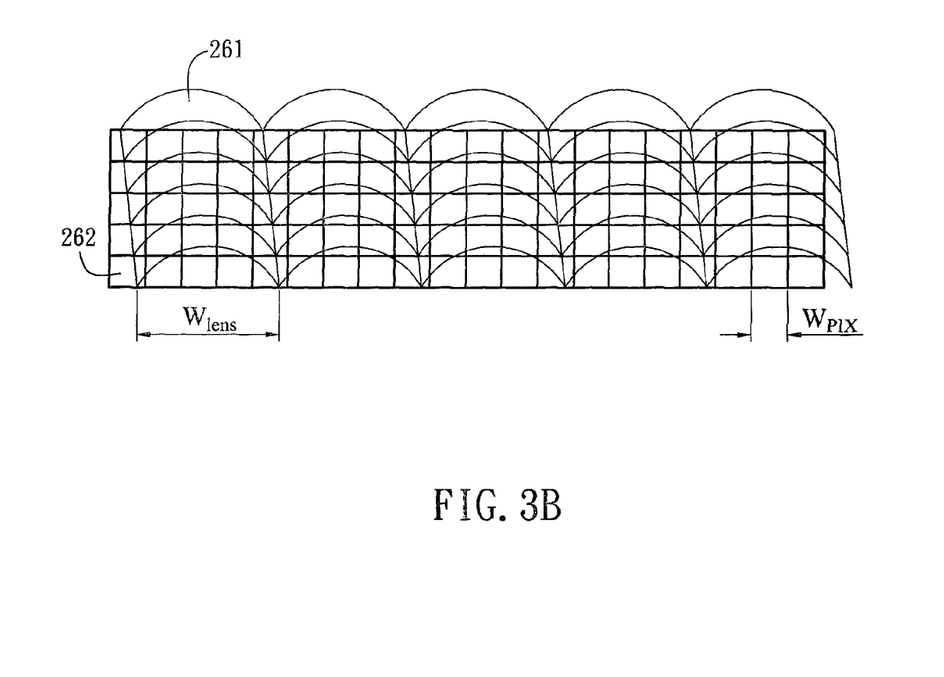

To be noted, as shown in FIG. 3B, the parallax element 261 is a lens structure containing a plurality of lenticular lens units. Otherwise, in practice, the parallax element 261 can also be a light switching structure composed of a liquid crystal layer and a specific transparent electrode pattern. In this case, the width $W_{lens}$ of each lenticular lens of the parallax element 261 is nearly equal to four times of the width $W_{PIX}$ of the sub-pixel 262 and is configured on the display module 26 in slant. Of course, the width of each lenticular lens may be equal to twice, triple or more than four times of the width of the sub-pixel 262.

The intensity calculating module 23 includes a sub-pixel intensity calculating unit 231 coupled to the pixel position calculating unit 221 of the position calculating module 22, and outputs the intensity coefficient information I3 according to the position information I2. In more specific, the sub-pixel intensity calculating unit 231 obtains the light intensity of each sub-pixel by calculation or look-up table according to the position information $K_{pixL}$ of the sub-pixels corresponding to the left eye and the position information $K_{pixR}$ of the sub-pixels corresponding to the right eye. In this embodiment, each parallax element 261 contains four sub-pixels 262, so that the intensity coefficient information I3 outputted by the sub-pixel intensity calculating unit 231 includes the sub-pixel intensity information L1, L2, L3, L4 corresponding to the left eye and the sub-pixel intensity information R1, R2, R3, R4 corresponding to the right eye.

The 3D image processing module 24 is coupled to the sub-pixel intensity calculating unit 231 of the intensity calculating module 23. The image converting module 25 includes a first frame memory unit 251, a first converting unit 252, a second converting unit 253, and a second frame memory unit 254. The first frame memory unit 251 is coupled to the original 3D image input module 27 for receiving the original 3D image information I4, and outputs a first set of gray-level information $G_R$, $G_L$ according to the original 3D image information I4. Herein, the original 3D image information I4 includes the left-eye image information (2D) and the right-eye image information (2D), and the gray-level information $G_L$ and the gray-level information $G_R$ represent the target gray-level information of the left-eye image information and the target gray-level information of the right-eye image information, respectively.

The first converting unit 252 is coupled to the first frame memory unit 251 and the 3D image processing module 24, and outputs the target intensity information I5 to the 3D image processing module 24 according to the first set of gray-level information $G_R$, $G_L$. Herein, the target intensity information I5 contains the target intensity information $Int_L$ of the left-eye image information and the target intensity information $Int_R$ of the right-eye image information.

The 3D image processing module 24 outputs the modified intensity information I6 according to the intensity coefficient information I3 and the target intensity information I5. In more detailed, the 3D image processing module 24 obtains the modified intensity information I6 by calculation or look-up table to integrate information for the left and right eyes according to the sub-pixel intensity information L1, L2, L3, L4 corresponding to the left eye, the sub-pixel intensity information R1, R2, R3, R4 corresponding to the right eye, and the target intensity information $Int_L$, $Int_R$ for the left-eye and right-eye image information. In this embodiment, the modified intensity information I6 contains four sub-information $Int_1$, $Int_2$, $Int_3$ and $Int_4$ corresponding to the four sub-pixels 262.

The second converting unit 253 of the image converting module 25 is coupled to the 3D image processing module 24 and outputs a second set of gray-level information $G_1$, $G_2$, $G_3$, $G_4$ according to the modified intensity information I6. In practice, the first converting unit 252 is a gray-level/intensity transformer, and the second converting unit 253 is an intensity/gray-level transformer. The second frame memory unit 254 is coupled to the second converting unit 253 and the display module 26, and outputs the modified 3D image information I7 to the display module 26 according to the second set of gray-level information $G_1$, $G_2$, $G_3$ and $G_4$.

As mentioned above, the sub-pixel intensity calculating unit 231 obtains the light intensity of each sub-pixel according to the position information $K_{pixL}$ of the sub-pixels corresponding to the left eye and the position information $K_{pixR}$ of the sub-pixels corresponding to the right eye, and the image converting module 25 provides the target intensity information $Int_L$ of the left-eye image information and the target intensity information $Int_R$ of the right-eye image information. Accordingly, the 3D image processing module 24 can integrate the intensity information of the left and right eyes so as to generate the modified intensity information I6, which can effectively reduce the undesired image cross-talk and the image motion juddering.

In this embodiment, four sub-pixels 262 are considered as a unit in the calculation, so that the 3D image display apparatus 2 of the invention has better resolution than the conventional 3D image display apparatus 1, which considers six sub-pixels as a unit. Furthermore the resolution loss impact can be minimized by a combination with horizontally higher density pixel configuration in this invention. For instance, when we combine four sub-pixels and double density pixel configuration, the resolution loss is only half that is practical level of the quality in 3D mode.

Figure 4:
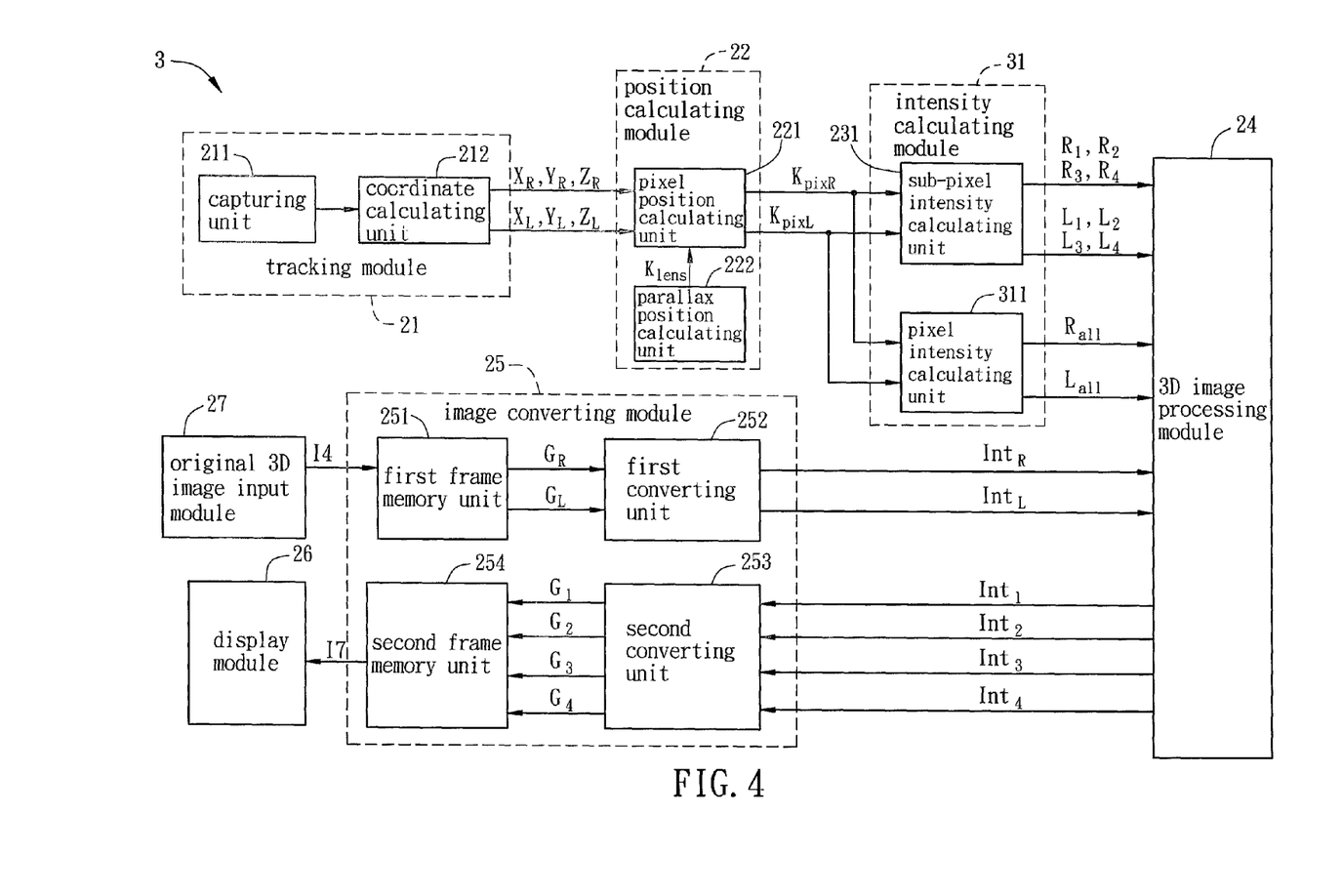
FIG. 4 is a schematic diagram showing another 3D image display apparatus according to the embodiment of the present invention.

FIG. 4 is a schematic diagram showing another 3D image display apparatus 3 according to the embodiment of the present invention. Different from the 3D image display apparatus 2, referring to FIG. 4, the intensity calculating module 31 of the 3D image display apparatus 3 further includes a pixel intensity calculating unit 311.

In this embodiment, the pixel intensity calculating unit 311 is coupled to the pixel position calculating unit 221 of the position calculating module 22, and outputs the pixel intensity information to the 3D image processing module 24 according to the position information I2 ($K_{pixL}$, $K_{pixR}$). The pixel intensity information contains the left-eye pixel intensity information $L_{all}$ and the right-eye pixel intensity information $R_{all}$. Herein, the value of the left-eye pixel intensity information $L_{all}$ is equal to the sum of the sub-pixel intensity information L1, L2, L3 and L4, and the value of the right-eye pixel intensity information $R_{all}$ is equal to the sum of the sub-pixel intensity information R1, R2, R3 and R4.

Except for the intensity coefficient information I3 and the target intensity information I5, the 3D image processing module 24 further receives the left-eye pixel intensity information $L_{all}$ and the right-eye pixel intensity information $R_{all}$. According to all of the received information, the 3D image processing module 24 can output the proper modified intensity information I6 for reducing the image cross-talk and the moiré issue.

Figure 5:
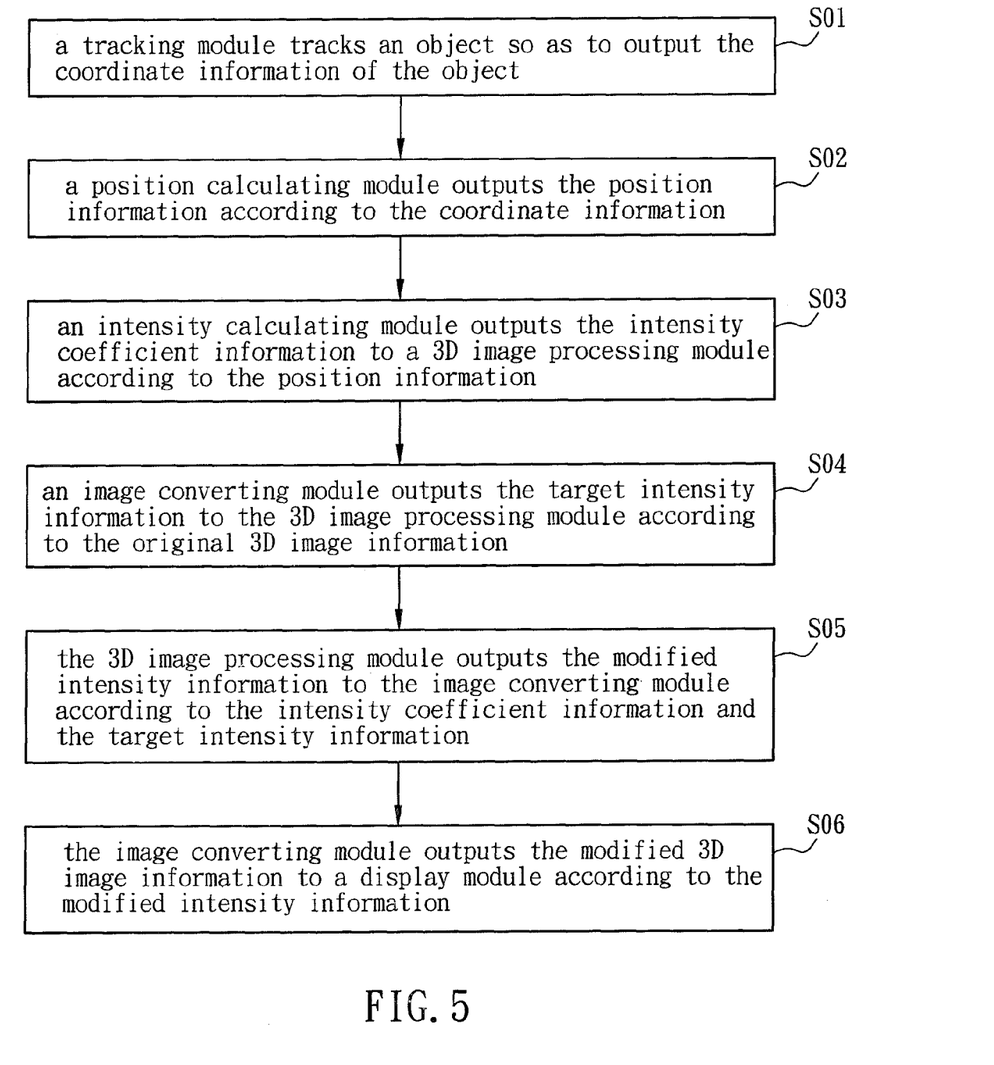
FIG. 5 is a flow chart of a 3D image processing method according to a preferred embodiment of the present invention.

The 3D image processing method according to a preferred embodiment of the invention will be described hereinafter with reference to the flow chart of FIG. 5 in view of FIGS. 2, 3A and 3B. The 3D image processing method can be applied to the above-mentioned 3D image display apparatus 2 and includes the steps S01 to S06.

In the step S01, a tracking module 21 tracks an object so as to output the coordinate information I1 of the object. In practice, the tracking module 21 retrieves the image of the object and then generates the coordinate information I1 according to the image of the object. In this embodiment, the tracking module 21 may include a camera mechanism for continuously tracking the eyes of the user and then outputting the coordinate information I1 containing the 3D coordinate information $X_L$, $Y_L$, $Z_L$, $X_R$, $Y_R$, $Z_R$ of the left and right eyes of the user. Alternatively, the tracking module 21 may track the head of the user, the center point between the eyes of the user, or the center point of the forehead of the user.

In the step S02, a position calculating module 22 outputs the position information I2 according to the coordinate information I1. In this embodiment, the pixel position calculating unit 221 of the position calculating module 22 receives the 3D coordinate information $X_L$, $Y_L$, $Z_L$ of the left eye and the 3D coordinate information $X_R$, $Y_R$, $Z_R$ of the right eye, as well as the parallax position information $K_{lens}$ outputted from the parallax position calculating unit 222, and then outputs the position information I2. Herein, the parallax position information $K_{lens}$ includes a parameter related to the parallax element 261 and each sub-pixel 262. The position information I2 contains the position information $K_{pixL}$ of the sub-pixels 262 covered by the parallax element 261 that is directly viewed by the left eye of the user, and the position information $K_{pixR}$ of the sub-pixels 262 covered by the parallax element 261 that is directly viewed by the right eye of the user. In more specific, the position information $K_{pixL}$ and the position information $K_{pixR}$ respectively satisfy the following equations (1) and (2):

$$K_{PIXEL} = \frac{K_{lens} \times W_{lens}\left(1 - \left(\frac{4 \times W_{PIX}}{W_{lens}} - 1\right) \times \left(\frac{Z_L}{D_{air}}\right)\right) - X_L}{W_{PIX}\left(\frac{Z_L}{D_{air}}\right)} \quad (1)$$

$$K_{PIXR} = \frac{K_{lens} \times W_{lens}\left(1 - \left(\frac{4 \times W_{PIX}}{W_{lens}} - 1\right) \times \left(\frac{Z_R}{D_{air}}\right)\right) - X_R}{W_{PIX}\left(\frac{Z_R}{D_{air}}\right)} \quad (2)$$

Herein, $W_{lens}$ represents the width of each lenticular lens of the parallax element 261, $W_{PIX}$ represents the width of each sub-pixel 262, and $D_{air}$ represents the perpendicular distance from the top of each lenticular lens of the parallax element 261 to the sub-pixel 262. In this embodiment, $W_{lens}$ is nearly equal to four times of the width of the sub-pixel 262.

In the step S03, an intensity calculating module 23 outputs the intensity coefficient information I3 to a 3D image processing module 24 according to the position information I2. In this embodiment, the sub-pixel intensity calculating unit 231 of the intensity calculating module 23 obtains the light intensity coefficient of each sub-pixel that light is directed to the object such as left-eye or right eye by calculation or look-up table according to the position information $K_{pixL}$ of the sub-pixels corresponding to the left eye and the position information $K_{pixR}$ of the sub-pixels corresponding to the right eye. In this embodiment, the intensity coefficient information I3 includes the sub-pixel intensity information L1, L2, L3, L4 corresponding to the left eye and the sub-pixel intensity information R1, R2, R3, R4 corresponding to the right eye.

In the step S04, an image converting module 25 outputs the target intensity information I5 to the 3D image processing module 24 according to the original 3D image information I4. In this embodiment, the image converting module 25 receives the original 3D image information I4 outputted from the original 3D image input module 27, and the first frame memory unit 251 of the image converting module 25 outputs a first set of gray-level $G_R$, $G_L$ according to the original 3D image information I4. Then, the first converting unit 252 of the image converting module 25 converts the first set of gray-level $G_R$, $G_L$ to obtain the target intensity information I5, and then outputs the target intensity information I5 to the 3D image processing module 24. Herein, the target intensity information I5 contains the target intensity information $Int_L$ of the left-eye image information and the target intensity information $Int_R$ of the right-eye image information.

In the step S05, the 3D image processing module 24 outputs the modified intensity information I6 to the image converting module 25 according to the intensity coefficient information I3 and the target intensity information I5. In this embodiment, the 3D image processing module 24 obtains the modified intensity information I6 by calculation or look-up table to integrate information for the left and right eyes according to the sub-pixel intensity information L1, L2, L3, L4 corresponding to the left eye, the sub-pixel intensity information R1, R2, R3, R4 corresponding to the right eye, and the target intensity information $Int_L$, $Int_R$ for the left-eye and right-eye image information. Herein, the modified intensity information I6 contains four sub-information $Int_1$, $Int_2$, $Int_3$ and $Int_4$.

In this embodiment, the sub-pixel intensity information L1, L2, L3 and L4 corresponding to the left eye are respectively 0, 0, 0.35 and 0.72, and the sub-pixel intensity information R1, R2, R3 and R4 corresponding to the right eye are respectively 0, 0.7, 0.2 and 0. When the sub-pixel intensity information of the corresponding left and right eyes are all equal to 0 (e.g. the sub-pixel intensity information L1 and R1), the sub-information $Int_1$ of the modified intensity information I6 satisfies the following equation:

$$Int_1 = \frac{Int_R \times \left(\frac{T}{R1+R2+R3+R4}\right) + Int_L \times \left(\frac{T}{L1+L2+L3+L4}\right)}{2}$$

Herein, T is a parameter smaller than the minimum value of the sum of the sub-pixel intensity information L1 to L4 or the sum of the sub-pixel intensity information R1 to R4. Besides, the parameter T can be varied depending on the specifications and designs of different products. To make the following description more clear, $$Int_R \times \left(\frac{T}{R1+R2+R3+R4}\right)$$

is represented by $Int'_R$, and $$Int_L \times \left(\frac{T}{L1+L2+L3+L4}\right)$$

is represented by $Int'_L$.

In addition, when the sub-pixel intensity information of the left eye is 0, and the sub-pixel intensity information of the right eye is not 0 (e.g. the sub-pixel intensity information L2 and R2 are 0 and 0.7 respectively), the sub-information $Int_2$ of the modified intensity information I6 satisfies the following equation:

$$Int_2 = Int'_R + \frac{R3 \times L3 \times (Int'_R - Int'_L)}{(R3+L3) \times R2}$$

Furthermore, when the sub-pixel intensity information of the left and right eyes are not 0 (e.g. the sub-pixel intensity information L3 and R3 are 0.35 and 0.2 respectively), the sub-information $Int_3$ of the modified intensity information I6 satisfies the following equation:

$$Int_3 = \frac{R3 \times Int'_R + L3 \times Int'_L}{R3 + L3}$$

Moreover, when the sub-pixel intensity information of the left eye is not 0, and the sub-pixel intensity information of the right eye is 0 (e.g. the sub-pixel intensity information L4 and R4 are 0.72 and 0 respectively), the sub-information $Int_4$ of the modified intensity information I6 satisfies the following equation:

$$Int_4 = Int'_L + \frac{R3 \times L3 \times (Int'_L - Int'_R)}{(R3+L3) \times L4}$$

In the step S06, the image converting module 25 outputs the modified 3D image information I7 to a display module 26 according to the modified intensity information I6. In this embodiment, the second converting unit 253 of the image converting module 25 receives the modified intensity information I6 and then converts it to a second set of gray-level information $G_1$, $G_2$, $G_3$, $G_4$. After that, the second frame memory unit 254 outputs the modified 3D image information I7 to a display module 26 according to the second set of gray-level information $G_1$, $G_2$, $G_3$, $G_4$.

Otherwise, the 3D image processing method of the embodiment can also be applied to the above-mentioned 3D image display apparatus 3. In this case, the 3D image processing method may further include the steps of: outputting the pixel intensity information to the 3D image processing module 24 by the intensity calculating module 31; and outputting the modified intensity information I6 by the 3D image processing module 24 according to the pixel intensity information, the intensity coefficient information I3 and the target intensity information I5.

In this embodiment, the pixel intensity information contains the left-eye pixel intensity information $L_{all}$ and the right-eye pixel intensity information $R_{all}$. Herein, the value of the left-eye pixel intensity information $L_{all}$ is equal to the sum of the sub-pixel intensity information L1, L2, L3 and L4, and the value of the right-eye pixel intensity information $R_{all}$ is equal to the sum of the sub-pixel intensity information R1, R2, R3 and R4. The target intensity information I5 contains the target intensity information $Int_L$ of the left-eye image information and the target intensity information $Int_R$ of the right-eye image information. The modified intensity information I6 satisfies the following equation:

$$I6 = \frac{Int_R \times \left(\frac{T}{R_{all}}\right) + Int_L \times \left(\frac{T}{L_{all}}\right)}{2}$$

Herein, T is a parameter smaller than the minimum value of the left-eye pixel intensity information $L_{all}$ or the right-eye pixel intensity information $R_{all}$. Besides, the parameter T can be varied depending on the specifications and designs of different products. As a result, the modified intensity information I6 integrating the left-eye pixel intensity information $L_{all}$ and the right-eye pixel intensity information $R_{all}$, the intensity coefficient information I3 and the target intensity information I5 can effectively reduce the moiré issue.

To sum up, in the 3D image display apparatus and processing method of the present invention, the intensity calculating module outputs the intensity coefficient information to the 3D image processing module according to the position information, and the image converting module output the target intensity information to the 3D image processing module according to the original 3D image information. Accordingly, the 3D image processing module outputs the modified intensity information, and the display module can generate the modified 3D image information according to the modified intensity information. This procedure allows to reduce the undesired cross-talk issue and to increase the resolution, thereby improving the display effect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A three-dimensional (3D) image display apparatus, comprising:

a tracking module, which tracks an object and outputs coordinate information of the object;

a position calculating module coupled to the tracking module and outputting position information according to the coordinate information;

an intensity calculating module coupled to the position calculating module and outputting intensity coefficient information according to the position information;

a 3D image processing module coupled to the intensity calculating module for receiving the intensity coefficient information;

an image converting module coupled to the 3D image processing module and outputting target intensity information to the 3D image processing module according to an original 3D image information; and a display module coupled to the image converting module for receiving modified 3D image information, wherein the 3D image processing module outputs modified intensity information according to the intensity coefficient information and the target intensity information, and the image converting module outputs the modified 3D image information according to the modified intensity information.

2. The 3D image display apparatus of claim 1, wherein the tracking module comprises:
a capturing unit for capturing an image of the object; and
a coordinate calculating unit coupled to the capturing unit and producing the coordinate information according to the image of the object.

3. The 3D image display apparatus of claim 1, wherein the position calculating module comprises:
a pixel position calculating unit coupled to the tracking module for receiving the coordinate information; and
a parallax position calculating unit coupled to the pixel position calculating unit and outputting parallax position information to the pixel position calculating unit,
wherein the pixel position calculating unit outputs the position information according to the coordinate information and the parallax position information.

4. The 3D image display apparatus of claim 3, wherein the intensity calculating module comprises:
a sub-pixel intensity calculating unit coupled to the pixel position calculating unit and outputting the intensity coefficient information according to the position information.

5. The 3D image display apparatus of claim 4, wherein the intensity calculating module further comprises:
a pixel intensity calculating unit coupled to the pixel position calculating unit and outputting pixel intensity information to the 3D image processing module according to the position information.

6. The 3D image display apparatus of claim 1, wherein the image converting module comprises:
a first frame memory unit, which receives the original 3D image information and outputs a first set of gray-level information;
a first converting unit coupled to the first frame memory unit and the 3D image processing module and outputting the target intensity information according to the first set of gray-level information;
a second converting unit coupled to the 3D image processing module and outputting a second set of gray-level information according to the modified intensity information; and
a second frame memory unit coupled to the second converting unit and the display module and outputting the modified 3D image information according to the second set of gray-level information.

7. The 3D image display apparatus of claim 1, further comprising:
an original 3D image input module coupled to the image converting module and outputting the original 3D image information to the image converting module.

8. A 3D image display processing method, comprising the steps of:
tracking an object so as to output coordinate information of the object by a tracking module;
outputting position information by a position calculating module according to the coordinate information;
outputting intensity coefficient information to a 3D image processing module by an intensity calculating module according to the position information;
outputting a target intensity information to the 3D image processing module by an image converting module according to an original 3D image information;
outputting modified intensity information to the image converting module by the 3D image processing module according to the intensity coefficient information and the target intensity information; and
outputting modified 3D image information to a display module by the image converting module according to the modified intensity information.

9. The 3D image processing method of claim 8, wherein the step of tracking the object so as to output the coordinate information of the object by the tracking module comprises:
capturing the image of the object by the tracking module; and
producing the coordinate information by the tracking module according to the image of the object.

10. The 3D image processing method of claim 8, wherein the position information represents positions of a plurality of sub-pixels on the display module corresponding to the coordinate information.

11. The 3D image processing method of claim 10, wherein the intensity coefficient information represents light intensity coefficients of the sub-pixels.

12. The 3D image processing method of claim 8, wherein the step of outputting the modified intensity information to the image converting module by the 3D image processing module according to the intensity coefficient information and the target intensity information comprises:
outputting pixel intensity information to the 3D image processing module by the intensity calculating module; and
outputting the modified intensity information by the 3D image processing module according to the pixel intensity information, the intensity coefficient information and the target intensity information.

13. The 3D image processing method of claim 8, wherein the step of outputting the modified 3D image information to the display module by the image converting module according to the modified intensity information comprises:
producing a first set of gray-level information by the image converting module according to the original 3D image information, and converting the first set of gray-level information to the target intensity information; and
converting the modified intensity information to a second set of gray-level information and outputting the modified 3D image information to the display module according to the second set of gray-level information.

14. The 3D image display apparatus of claim 1, wherein the tracking module tracks the object as the center point of each eye, the center point between the eyes, or the center point of the forehead.

15. The 3D image processing method of claim 8, wherein the tracking module tracks the object as the center point of each eye, the center point between the eyes, or the center point of the forehead.

* * * * *